(No Model.)
A. E. OSBORN.
FEED WATER REGULATOR.
No. 290,100. Patented Dec. 11, 1883.
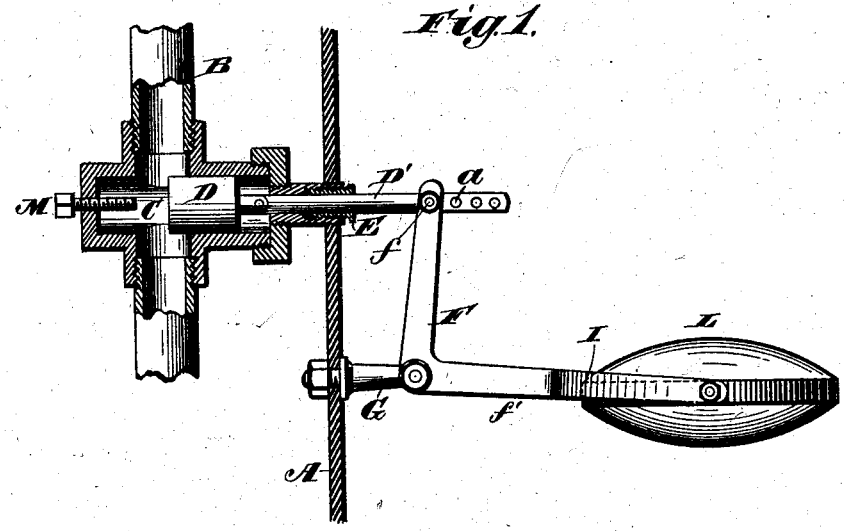
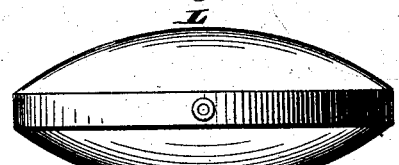
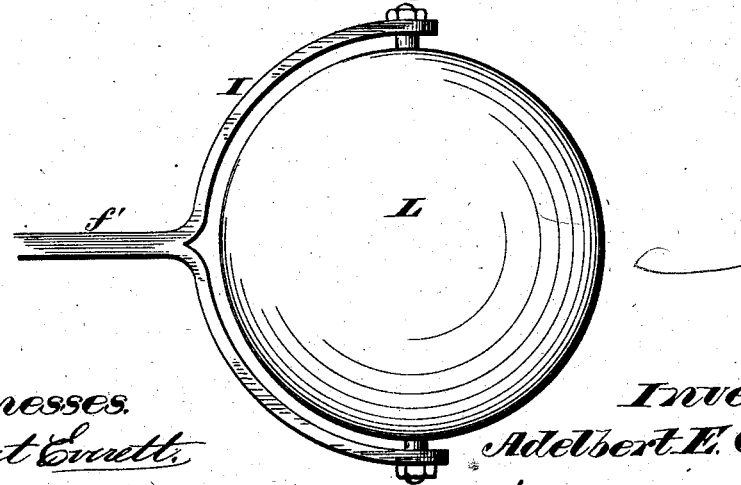
Witnesses.
Robert Everett
Jno. S. Coombs
Inventor:
Adelbert E. Osborn.
By James L. Norris.
Atty.

UNITED STATES PATENT OFFICE.

ADELBERT E. OSBORN, OF WACO, TEXAS, ASSIGNOR TO THE MODEL MACHINE COMPANY, OF SAME PLACE.

FEED-WATER REGULATOR.

SPECIFICATION forming part of Letters Patent No. 290,100, dated December 11, 1883.

Application filed September 10, 1883. (No model.)

*To all whom it may concern:*

Be it known that I, ADELBERT E. OSBORN, a citizen of the United States, residing at Waco, in the county of McLennan and State of Texas, have invented new and useful Improvements in Feed-Water Regulators for Water-Heaters, of which the following is a specification.

My invention relates to feed-water regulators for water-heaters, the object thereof being to provide a simple and effective apparatus whereby the supply of water to the heating-vessel shall be automatically graduated in proportion to the withdrawal of water therefrom.

To this end my invention consists in the combination, with the heater, of a supply-pipe having a valve-chamber, a valve opening and closing said pipe, and having a stem which is packed through the wall of the heater, a bell-crank lever fulcrumed upon a stud projecting from the inner wall of the heater, and actuated by a float connected with one arm, the other arm being connected to the valve-stem, whereby the supply-pipe is opened and closed by the fall and rise of the water-level in the heater.

Referring to the drawings forming part of this specification, Figure 1 is a vertical section, showing a portion of the heater with the valve-chamber of the supply-pipe and the bell-crank and float by which the valve is operated. Fig. 2 is an edge elevation of the float detached. Fig. 3 is a plan view of the float with its connecting device.

A in said drawings represents a portion of the wall of the heater, which is of the usual construction. Water is supplied thereto by a pipe, B, within which is formed a valve-chamber, C, having a cylindrical valve, D, arranged therein. This valve has a stem, D', which is packed through the wall of the heater A by means of an ordinary stuffing-box, E, which enters said wall. The valve-stem D' has one, or more than one, perforation, d, to receive a pivot-bolt, f, by which the vertical arm of a bell-crank, F, is connected to said stem. This bell-crank is pivoted at its angle to a stud, G, projecting from the inner face of the wall of the heater A, below the valve-stem, and to the horizontal arm f' is attached a bifurcated end, I, to which is secured a float, L. This device, which is formed of copper or other suitable material, has the form of an oblate spheroid, and may be secured to the connecting-rod I by forking the end of the latter and securing each branch of the fork to a stud, i, projecting from the side of the float, as shown in Fig. 3. The supply-pipe B passes through the valve-chamber C, and in the end of the latter is tapped an adjusting-screw, M, by which the movement of the valve is limited, so that it may not entirely close the opening in the pipe.

The operation of the mechanism is as follows: When water is withdrawn from the heater A, the fall of the water-level causes the float L to descend, opening the pipe B, and permitting a flow of water into the heater. As the water rises, the float, being buoyed up, closes the valve slowly, the bell-crank F operating the valve until the water is restored to its usual level, when the valve closes entirely. It will readily be seen that by this contrivance the supply to the heater is proportioned to the volume of water drawn therefrom, and this supply is at all times automatically regulated by the valve D and float L.

I find in practice that a little water condenses in the float, and for the purpose of removing the same, which should be done once in from four to six weeks, I perforate one of the studs i, said opening extending into the interior of the float, and being closed by the cap-nut, which holds the forked arm of the lever upon the stud.

Having thus described my invention, what I claim is—

1. The combination, with a water-heater, of a supply-pipe therefor, a valve-chamber in the pipe, a sliding valve arranged to move across the valve-chamber to check the passage of water therethrough, a stem connected with the valve and packed through the wall of the heater, and a bell-crank lever pivoted at its angle within the heater, and having one arm connected with the valve-stem, and the other arm carrying a float to slide the valve-stem and the valve by the fall and rise of the water-level in the heater, substantially as described.

2. The combination, with the water-heater having a supply-pipe provided with a valve-chamber, of a valve having its stem packed through the wall of the heater, and operated by a bell-crank and float, and a set-screw entering the end of the valve-chamber, and adapted to limit the movement of the valve, substantially as described.

3. The combination, with the heater A, of the supply-pipe B, having valve-chamber C, the valve D, valve-stem D', bell-crank F, pivoted to stud G, the float L, having the form of an oblate spheroid, and the set-screw M, placed in the end of the valve-chamber, substantially as described.

In testimony whereof I have hereunto set my hand in the presence of two subscribing witnesses.

ADELBERT E. OSBORN.

Witnesses:
E. A. McKENNEY,
W. H. JENKINS.